United States Patent
Paleja et al.

(10) Patent No.: US 8,527,361 B2
(45) Date of Patent: Sep. 3, 2013

(54) SERVICE FOR ADDING IN-APPLICATION SHOPPING FUNCTIONALITY TO APPLICATIONS

(75) Inventors: Ameesh Paleja, Irvine, CA (US); Sunbir Gill, Irvine, CA (US); Matthew A. Jones, Ladera Ranch, CA (US); Alexander L. Rouse, Seattle, WA (US); Mekka C. Okereke, Irvine, CA (US); Yael Peled, Los Angeles, CA (US)

(73) Assignee: Amazon Technologies, Inc., Reno, NV (US)

( * ) Notice: Subject to any disclaimer, the term of this patent is extended or adjusted under 35 U.S.C. 154(b) by 115 days.

(21) Appl. No.: 13/170,074

(22) Filed: Jun. 27, 2011

(65) Prior Publication Data

US 2012/0330786 A1 Dec. 27, 2012

(51) Int. Cl.
*G06Q 30/00* (2012.01)
*G06Q 30/06* (2012.01)

(52) U.S. Cl.
CPC ............................ *G06Q 30/06* (2013.01)
USPC ...................................... 705/26.1

(58) Field of Classification Search
USPC ..................... 705/26.1, 27.1, 904
See application file for complete search history.

(56) References Cited

U.S. PATENT DOCUMENTS

| | | | |
|---|---|---|---|
| 2003/0055927 A1* | 3/2003 | Fischer et al. | 709/221 |
| 2004/0049412 A1* | 3/2004 | Johnson | 705/5 |
| 2008/0092107 A1 | 4/2008 | McWilliam et al. | |
| 2010/0067705 A1 | 3/2010 | Boccon-Gibod et al. | |
| 2010/0146432 A1 | 6/2010 | Robbin et al. | |
| 2010/0233996 A1* | 9/2010 | Herz et al. | 455/411 |

OTHER PUBLICATIONS

Anonymous, "Google Puts iPad® in its Crosshairs," Edmonton Journal, Feb. 3, 2011.*
International Search Report and Written Opinion for International Application No. PCT/US2012/044073, Notification mailed Oct. 1, 2012.

* cited by examiner

*Primary Examiner* — Amee A Shah
(74) *Attorney, Agent, or Firm* — Knobbe Martens Olson & Bear LLP

(57) ABSTRACT

An application management system modifies developer-submitted applications, such as mobile applications, to add various types of functionality before such applications are made available for purchase. The added functionality may, for example, enable end users to make in-application purchases of content items from an application store. As another example, Digital Rights Management (DRM) functionality may be added for controlling user access to content items, such as content items available in an application store.

30 Claims, 3 Drawing Sheets

SERVICE FOR ADDING IN-APPLICATION SHOPPING FUNCTIONALITY TO APPLICATIONS

BACKGROUND

The growth of the Internet has made digital distribution of content more desirable. The lower costs of digital distribution over a computer network versus distribution using physical media can only be expected to further drive the growth of the digital distribution channel. A growing number of content types such as applications, games, music, books and movies are now available through digital downloads, including mobile applications for wireless devices (sometimes called "apps"), as well as applications for browsers and operating system desktops.

With the growth of digital content, content developers are able to distribute applications and other content items at relatively low cost. This has resulted in the growth of the market for digital content items. The increase in digital content items has created a need for systems for managing, tracking and transferring rights to such content items. Among other capabilities, these systems can allow applications and content items to be monetized.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the invention.

DETAILED DESCRIPTION OF SPECIFIC EMBODIMENTS

I. Introduction

Figure 1:
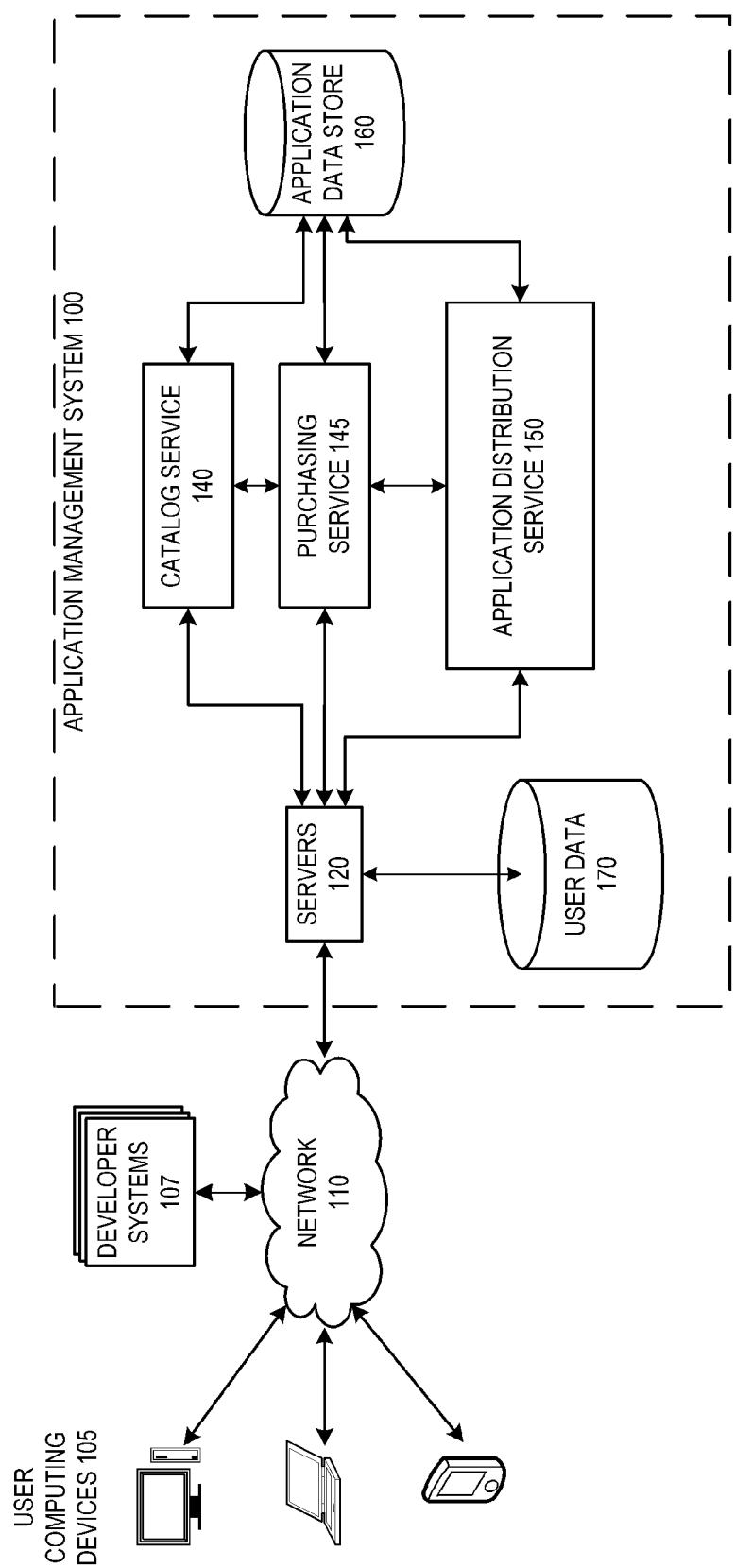
FIG. 1 is a network diagram schematically illustrating an example of an application management system that adds functionality to applications submitted by developers.

Many applications, such as games, allow users to purchase content items or other additions to the application, such as game maps, game items, characters, UI themes, music, levels, additional functionality, etc. These content items can be purchased from digital content stores or content marketplaces and can then be utilized within the application. Some applications allow purchases from within the application ("in-app purchases"). Generally, the application developer includes support for in-app purchases by including specific code in the application. However, adding such in-app purchasing code can increase the complexity and development time of applications, lead to potential bugs or errors in the application, or otherwise increase the costs of development. In some instances, the developer may not have the experience needed to develop such code and thus cannot offer in-app purchases.

This disclosure describes systems and associated processes that provide a solution to the above problem. In certain embodiments, these systems and processes can advantageously insert modules for providing additional functionality in an application, such as a purchasing module and/or a Digital Rights Management (DRM) module. Examples of such DRM modules that can be used herein are described in U.S. application Ser. No. 13/044,478, filed Mar. 9, 2011, titled "Digital Rights Management for Applications," the disclosure of which is hereby incorporated by reference in its entirety. Such inserted code modules can provide features and services to users without the developer having to develop all or most of the application code for the features. Further, as the modules can be added after the application has already been developed, the additional features may be added to the application with minimal or no changes to the existing development process of the developer.

In one example, these systems and processes can be implemented in the context of an application store or application management system that distributes applications for purchase and/or download to user devices. Developers can submit applications to the application management system for distribution to end users. In response to receiving an application from a developer, the application management system can insert code modules into the application, such as a purchasing module, which allow end users to purchase and/or download content items associated with the application. Other code modules can also be inserted to provide additional functionality. For example, a DRM module can be added for verifying that users are entitled to access particular content items. The DRM module may also prevent or otherwise reduce copying or modifying of the application and/or content items.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection is defined by the claims.

II. Application Management System Overview

FIG. 1 is a network diagram schematically illustrating an example of an application management system 100 that provides additional functionality to applications submitted by developers. The application management system 100 can communicate with user computing devices 105 and developer systems 107 using a network 110. The application management system 100 can receive applications from developer systems 107, modify the applications, and provide those applications to user computing devices 105. The application management system 100 can modify a developer-submitted application by inserting code modules that enable access to one or more services provided by the application management system 100 (or by other entities). These services may, for example, include services for managing downloads and/or purchases of applications and content items, and services for verifying content item entitlements. In some embodiments, code modules are inserted by decompiling applications into source code, inserting code snippets that reference the code modules, and then recompiling the application. The code snippets may be inserted at automatically-selected insertion points in the source code. The application management system 100 may also provide a catalog service 140 for providing or selling content items associated with a particular application. The system 100 may be operated by a content management service provider.

Although the system and processes of the disclosure are described primarily in the context of a submission by a developer, the app may alternatively be submitted by another entity, such as an application publisher, content creator, or other entities that submit applications. The term "purchases" and similar variations generally refers to a transaction in which a user pays to obtain or use an application or content item, but may also refer to a transaction in which the application content item is made available to the user for free (e.g., during a promotional period or as a trial). The term "entitlement" is used herein to refer somewhat interchangeably to (1) a legal right or authorization that is or can be granted, and (2) a computer representation of that legal right or authorization. Depending upon the context of its use, the term may refer more specifically to one of these two items.

The application management system 100 can include any computer-based system capable of receiving the applications and application content items from developers and providing the applications and application content items to users. The applications and application content items can be made available via download, streaming, application virtualization, or the like. This can include, for example, making the application available for a one-time cost, for a subscription, or for free. Further, this can include, for example, making the application available to any number of users, to a predetermined number of users, to a predetermined set of users, for a limited time, for a limited number of uses, or indefinitely.

The application management system 100 can include one or more servers 120 for receiving and responding to network requests from the user systems 105 and/or developer systems 107, a catalog service 140 and associated search engine, a purchasing service 145, and an application distribution service 150. The services may be implemented by execution of code modules on the one or more servers 120 or on separate servers. The application management system 100 can also include an application data store 160 for storing application-related data and content items and a user data store 170 for storing user-related data, such as account information. Other services may also be provided by the application management system 100.

Developers, using their computing systems 107, can develop applications and content items and submit them to the application management system 100 to have those applications and content items made available for purchase and/or download by users for their user computing devices 105, such as wireless mobile devices (such as smart phones, PDAs, tablets, e-book readers or the like), desktops, laptops, video game platforms, television set-top boxes, televisions (e.g., internet TVs), and computerized appliances, to name a few. The user computing device 105 may be any type of computing device. Further, it is possible for the user devices 105 to be different types of devices, to include different applications, or to otherwise be configured differently. In addition, the devices 105 can include any type of operating system ("OS"). For example, the computing devices 105 can implement an Android™ OS, a Windows® OS, a Mac® OS, iOS (iPhone or iPad OS), a Linux or Unix-based OS, or the like.

The application management system 100 can provide services for adding additional functionality, such as services for managing or coordinating the distribution of applications and application content items. Many applications do not have built-in functionality for allowing in-app purchasing, where users of those applications can obtain additional or "add-on" application content items distinct from the application itself. One alternative to in-app purchasing is to allow purchases or downloads of content items through interfaces external to the application, such as through web services (e.g. websites) or a device-installed application store. However, by adding in-app purchasing functionality to these applications, application content items may then be purchased or obtained from within these applications, streamlining the purchasing process for application users. For example, in-app purchasing can simplify integration of content items with the purchasing application or reduce or eliminate interruptions to the user experience of using the application.

Application content items can include game maps, game levels, game saves, game items, game characters, game data, videos, images, music, designs, avatars, characters, descriptions, guides, hints, news, e-books, other written messages or content or the like. These content items can be utilized within the applications associated with the content items. In one example, a user using an e-reader device or other computing device having an e-reader application can purchase an electronic book within the e-reader application for reading on the device.

After receiving the content submission from the developer, the application management system 100 can modify the application by adding modules for additional functionality, such as a DRM module or purchasing module. After modifying the application, the application management system 100 can list the application and/or application content items with the catalog service 140 (or with a third-party catalog service). For example, the application management system 100 can cause the item to be added to a browsable electronic catalog from which the application or content items can be purchased.

In one embodiment, the application modification is accomplished programmatically by the application management system 100. In some embodiments, the application management system 100 decompiles the application into source code. The application management system 100 then analyzes the source code to determine insertion points for additional functionality. For example, the source code may follow coding standards, such that particular functionality can be found by the system 100 in predetermined locations, functions or classes. In another example, the application management system 100 can search for patterns in the source code that indicate a menu or selection interface for the application. The application management system 100 can then insert a new menu item, or code snippet, that calls an inserted module. In one example, the new menu item calls a purchasing module that provides a catalog interface for communicating with the catalog service 140. The catalog interface can provide access to catalog items of the catalog service 140 within the application.

III. Application Management System Details

In the embodiment of FIG. 1, the application management system 100 includes one or more servers 120, the catalog service 140, the purchasing service 145, the application distribution service 150, the application data store 160 and the data store for user data 170. The one or more servers 120 can receive and respond to network requests from the user computing devices 105 and/or developer systems 107 received over the network 110.

The catalog service 140, which can include a search engine, allows users to browse an electronic catalog provided by the catalog service 140 or query the search engine to obtain information about electronic catalog content stored in the application data store 160. The electronic catalog content can include information about products and/or services. The catalog service 140 can also provide application content items associated with respective developer applications for sale or for free. The catalog service 140 may be accessed by a catalog interface such as a network application interface (e.g., a web server), an Application Programming Interface (API), or other type of interface. In one embodiment, an application operating on the user computing device 105 having a purchasing module is in communication with the catalog service 140 in order to provide the application with access to content items associated with the application.

The catalog service 140 can provide a catalog or listing of items available for purchase or download, such as applications and content items associated with respective applications. The catalog may also include content item metadata that describes the content items. Catalog pages may be displayed as a popup window or a menu screen within the accessing application.

In one embodiment, the electronic catalog content is arranged in a hierarchical structure, having items associated with one or more categories or browse nodes in a hierarchy. The catalog service 140 can provide functionality for users to browse the item hierarchy in addition to searching the catalog. Users can select an item represented in the hierarchy or in a list of search results to see more details about an item. In response to a user item selection, the server 120 can provide to a user system 105 a catalog page (sometimes called an item detail page) that includes details about the selected item.

The catalog page or detail page for a given application may, for example, include a description provided by the item's creator, price information, information about the item's creator, customer reviews, device compatibility information, screen shots, and other types of information that may be useful to customers. In some embodiments, the detail page can include a list of available application content items associated with the given application. In some embodiments, the list may be filtered or generated based on settings or information associated with a user account. The content list may also be filtered using a variety of criteria, such as ratings, price, popularity or availability.

The purchasing service 145 can include services for managing user purchases and personalization services for providing personalized information to users. The purchasing service 145 can receive customer orders, bill or accept payment from the user for the order, credit a seller or developer for the purchase, split payments between different parties, collect taxes paid on the purchase and distributed the collected taxes to the appropriate governing entities taxes, calculate or convert prices between different currencies (e.g., dollar to euro or yen), and/or arrange for distribution of the content item. The purchasing service 145 may perform other functions related to order processing. In some embodiments, the purchasing service 145 may split fees received from end users (e.g., purchase fees or content delivery fees) with the accounts of developers and/or the operator of the application management system 100. The purchasing service can also provide additional functionality, as further described below.

The application distribution service 150 can combine modules with applications or otherwise modify the applications to provide additional functionality. For example, the application distribution service can insert a purchasing module into an application. The modified application can then provide a user interface through which the user, via a user computing device 105, can access an app store or electronic catalog over a network in order to make purchases and conduct other transactions. The purchasing module can include components for browsing and/or searching a catalog of applications, which may be stored in the application data store 160. The purchasing module can, but need not, rely on the functionality of the catalog service 140 for this browse and/or search functionality. Further, in some embodiments, the purchasing module can interact with the purchasing services 145 to generate and/or obtain recommendations for users based on application selection or usage behavior, among possibly other recommendation criteria. The application distribution service 150 can also combine DRM functionality with applications to enable protection from copying or modifying of applications.

After the application management system 100 receives a content submission from the user, the application management system 100 stores content submission data, such as the application(s), application content item(s) or content metadata, on the application data store 160 (e.g., database, flat file or data structure on a storage device such as a file server, hard drive, optical drive, etc.) of the application management system 100. Another data store 170 can store user data, such as user credentials related to user accounts. For example, the application management system 100 may check access credentials received with the content submission to determine whether the user submitting the content has access rights to an account maintained by the application management system 100. If access rights are verified, the application management system 100 can then update content submissions and other data associated with the account. In different embodiments, the application data store 160 and data store for user data 170 may be the same or separate data stores.

Figure 2:
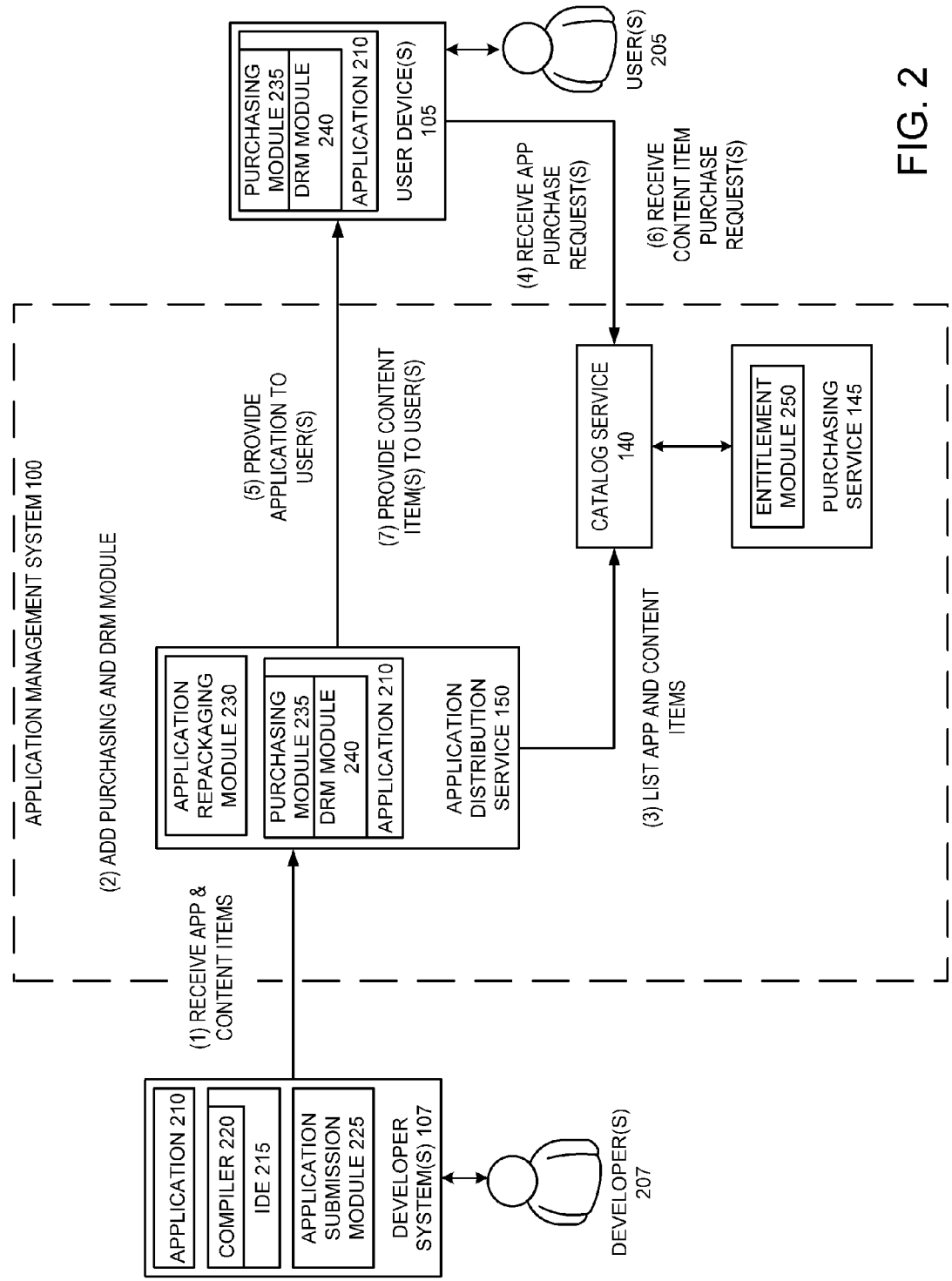
FIG. 2 schematically illustrates a logical flow diagram for an example application processing scenario involving the application distribution system of FIG. 1.

FIG. 2 schematically illustrates a logical flow diagram for an example application processing scenario involving the application distribution system 100 of FIG. 1. During the scenario, a developer 207 creates an application 210 for submission to the application distribution system 100, which then modifies the application 210 and provides the modified application 210 to one or more users 205. The application 210 may, for example, be a game, navigation app, social networking app, business app, productivity app, utility app, media app, e-reading app, entertainment app or the like.

In one scenario, the developer 207 creates the application 210 using the developer system 107. The developers 207 can use an Integrated Developer Environment ("IDE"), such as IDE 215, and a compiler 220 to develop the application 210. The IDE 215 can include any system for facilitating code development. For example, for Java development, the IDE 215 can include the Eclipse IDE available from The Eclipse Foundation™. Further, the IDE can include the compiler 220, which can include any compiler capable of compiling source code associated with the application 210 into the application 210. In some embodiments, the IDE 215 can be used to combine the purchasing module 235 and/or DRM module 240 with the application 210 instead of using the application repacking module 230 to do so.

At event 1 of FIG. 2, the application distribution service 150 receives the application 210 and/or content items for the application 210. In one embodiment, the application distribution service 150 then processes the application 210 to provide additional functionality by adding modules, which can include associated code snippets, to the application.

At event 2 of FIG. 2, the application distribution service 150 combines the purchasing module 235 and/or the DRM module 240 with the application 210. The purchasing module 235 can enable the user computing device 105 to communicate with the catalog service 140 and/or the purchasing service 145 to provide in-app purchasing functionality to the application. For example, the purchasing module 235, when executed on a user computing device 105, can communicate with the catalog service 140 to provide a listing of catalog items to the user 205. In one embodiment, the application distribution service 150 modifies a menu screen in the application to provide a link (e.g. static or dynamic) or menu item that opens a catalog interface, such as a popup screen or window, which provides access to an electronic catalog. In another example, the purchasing module 235 enables communication between the user computing device 105 and the purchasing service 145 to handle the purchase of content items for the application 210 or to verify entitlements for downloaded content items.

In one embodiment, the DRM module 240 enables the computing device 105 to verify that the application 210 has not been modified without authorization, which may prevent unauthorized users from accessing and/or executing the application 210. In one embodiment, the DRM module 240 can prevent unauthorized copying and/or moving the application, for example, from one user device 105 to another user device, or from a user device 105 to a recordable medium, such as an SD card, a CD, or a USB key, or from a user device 105 to a network device or service (e.g., cloud storage), to name a few. Advantageously, in some embodiments, if the application 210 is copied from a user device 105 to a second user device, the DRM module 240 can prevent the application 210 from being executed on the second user system. Alternatively, in some embodiments, the DRM module 240 will not prevent copying or execution of the application 210 on the second user system, for example, so long as the same user is using the application 210.

To facilitate combining the additional modules with the application 210, the application distribution service 150 can include an application repackaging module 230. The application repackaging module 230 can include any system capable of decompiling the application 210, combining the DRM module 240 with the decompiled application, and recompiling the application 210 with the DRM module 240.

In event 3 of FIG. 2, the application distribution service 150 instructs the catalog service 140 to list the application 210 and/or digital content items associated with the application 210. Once listed on a catalog associated with the catalog service 140, users 205 can then purchase the application 210.

In event 4 of FIG. 2, the catalog service 140 receives a purchase request for the application 210 from a user device 105. The catalog service 140 can communicate with the purchasing service 145 to process the purchase. For example, the purchasing service 145 can bill the user 205 for the purchase. In one embodiment, the purchase service 145 includes an entitlement module 250 for coordinating with the DRM module 240 to determine access rights of the computing device 105 to the application 210 or content items associated with the application 210.

In event 5 of FIG. 2, the catalog service 140 (or purchasing service 145) instructs the application distribution service 150 to provide the modified application 210 to the purchasing user device 105. The application service 210 transmits the modified application 210 with the added purchasing module 235 and DRM module 240 to the user device 105.

In event 6 of FIG. 2, the user 205 operates the application 210 on the user device 105. The user 205, utilizing the purchasing module 235, is able to access the catalog service 140 from within the application 210. This provides the user with in-app purchasing functionality, allowing purchasing of content items from within the application 210. For example, by utilizing a menu interface provided by the purchasing module 235, the user 205 can send a content item purchase request to the catalog service 140. The catalog service 140 can then coordinate with the purchasing service 145 to process the content item purchase.

In event 7 of FIG. 2, the catalog service 140 (or purchasing service 145) instructs the application distribution service 150 to provide the requested content item to the user device 105. The purchasing module 235 can receive the content item and make the content item available in the application 210. In some embodiments, the DRM module 240 verifies that the application 210 and/or user 205 are authorized to access the content item.

As will be apparent, other types of modules can be injected into the application 210 to provide additional functionality. By allowing programmatic modification of applications 210, development time for applications 210 can be reduced, additional functionality can be added, and/or the development process can be simplified.

IV. Example Module Repackaging Process

Figure 3:
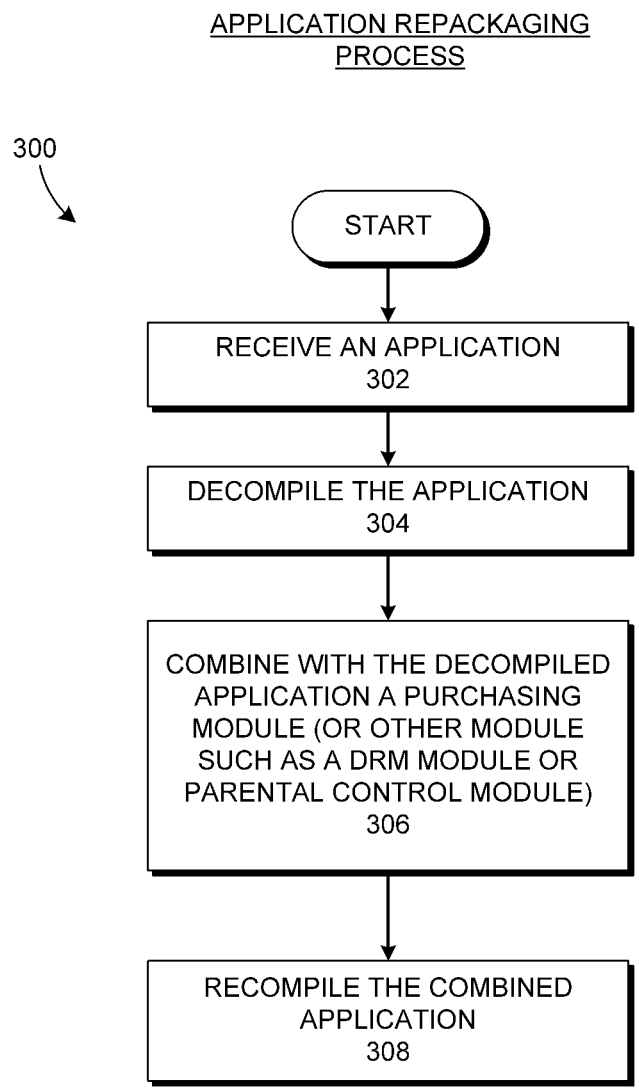
FIG. 3 illustrates a flow diagram for one embodiment of a process for combining an application and an additional module.

FIG. 3 illustrates a flow diagram for one embodiment of a process 300 for combining an application 210 and an additional functionality module, such as the purchasing module 235 or DRM module 240 of FIG. 2, a parental control module or other module for providing additional functionality. Process 300 can be implemented by the application repackaging module 230 of the application distribution service 150, the application submission module 225, or the IDE 215. To simplify discussion, process 300 will be described as being performed by the application distribution service 150, which combines the applications 210 with the purchasing module 235 of FIG. 2. However, other alternative embodiments are possible, such as adding different modules to provide other functionality.

The process 300 begins at block 302 when an application 210 is received by, for example, the application distribution service 150 from the developer 207 who created the application 210 or provided the application 210 to, for example, the application management system 100. The application distribution service 150 decompiles the application 210 at block 304 to obtain a decompiled copy of the application 210. At block 306, the application distribution service 150 combines the decompiled copy of the application 210 with a purchasing module 235.

In one embodiment, the purchasing module 235 includes one or more of a developer certificate associated with the developer 207 and an application provider certificate associated with the application management system 100.

In some embodiments, combining the decompiled copy of the application 210 with the purchasing module 235 includes identifying entry points associated with the application 210. Entry points can include any routine, component, function, method, class, or access point to an application that enables a user or a system to start, instantiate, pause, resume, launch, or initialize the application. In some embodiments, combining the decompiled copy of the application 210 with the purchasing module includes inserting and/or injecting code associated with the purchasing module into one or more routines, components, functions, methods, or classes, associated with the entry points.

In some embodiments, combining the decompiled copy of the application 210 with the purchasing module includes determining one or more base classes associated with one or more parts of the application 210. Although not limited as such, these parts of the application 210 can be associated with entry points. In some embodiments, the purchasing module is configured to be executed when one or more of the base classes are called.

In one embodiment, the purchasing module can include replacement or supplemental lifecycle routines, classes, or methods that are called in place of, or prior to, existing lifecycle routines. For example, the purchasing module can include a subclass of a base class used by the application 210. The subclass of the purchasing module can be called and/or executed before any subclass of the application 210 is called and/or executed. As an example, in the Android™ operating system available for mobile devices from Google®, lifecycle entry points or routines such as on Create( ) on Start( ) on Pause( ) on Resume( ) and on Destroy( ) are used by applications to handle application launch, start, pause, resume, and exit events, respectively. The purchasing module can include versions of one or more of these lifecycle methods in a class that is a subclass of the Activity base class used by some or all Android applications. When one of the lifecycle routines is called, the purchasing module version of the routine can be called before (or in some embodiments, after) the corresponding routine of the application 210 is called, allowing the purchasing module to perform a DRM analysis and/or collect data about the application 210. In some embodiments, the purchasing module completes execution before calling the base class associated with the entry point.

In some embodiments, the purchasing module 235 is executed in parallel and/or asynchronously with the application 210, such as in another thread of execution. The purchasing module can therefore advantageously run in the background while allowing the application 210 to load, thereby reducing an impact on load time for the application 210.

In embodiments where a DRM module 240 is inserted, the application 210 is allowed to launch and run at least momentarily while the DRM module confirms whether the application 210 (or user thereof) is authorized to execute. If the application 210 or user is not authorized, the DRM module can then alter execution of the running application 210, for example, by killing the application 210 or disabling a feature or set of features of the application.

Although many applications have a single entry point, which begins execution of the application, some applications have more than one entry point. Identifying the entry points may be an automated or manual process. In one embodiment, the entry points are identified programmatically. In some embodiments, the entry points are identified in the application 210 by the developer 207 or developer system 107, for example, by placing entry tags or markers into the code where inserted modules may be called. In other embodiments, the application distribution service 150 analyzes the application 210 to identify the entry points. In some embodiments, the application distribution service 150 can insert code that results in the purchasing module being executed each time an entry point associated with the application 210 is accessed or executed. For some devices and systems, identifying entry points at repackaging time can be optional. Instead, the purchasing module can be designed to listen for entry by the application at any available entry point.

Some examples of entry points can include launching the application, terminating the application, pausing the application, and resuming the application from a waiting state. An application that uses messaging features such as text, email, or IM might also have communication-related entry points, such as read, write, and so forth. The entry points can be triggered by an operating system or by the application itself. For instance, the operating system might perform a system call to launch the application as a process. The purchasing module can listen for such a system call. The application, on the other hand, might make a call to terminate itself, and the DRM module can also listen for such a call.

In one embodiment, combining the decompiled copy of the application 210 with the purchasing module includes adding a library of code to the application 210. The library of code can include a shared library, a static-link library, a dynamic-link library ("DLL"), combinations of the same, or the like. In one embodiment, adding the library of code can include injecting the library of code into the application 210. In one embodiment, adding the library of code can include modifying the code associated with the application 210.

At block 308, the application distribution service 150 recompiles the combined decompiled copy of the application 210 with the purchasing module 235. In one embodiment, the application 210 with the purchasing module 235 is stored on the application data store 160. The application management system 100 can retrieve the application 210 with the purchasing module 235 from the application data store 160 each time a user 205 purchases (for a price or for free) or requests a copy of the application 210. In other embodiments, application 210 is stored with the application data store 160 without the purchasing module 235. In these embodiments, the application distribution service 150 can perform process 300 each time a user attempts to obtain a copy from or access the application 210 on the application management system 100.

In one embodiment, the recompiled application 210 can be signed with an application provider certificate associated with the application management system 100.

In one embodiment, the application management system 100 can provide the recompiled application 210 to the developer 207 to be signed with a developer certificate associated with the developer 207.

In one embodiment, in addition to the purchasing module, or instead of the purchasing module, the application distribution service 150 can use the process 300 to insert or combine any other type of module with the application 210. For example, the application distribution service 150 can use the process 300 to insert a module that can monitor the health of the application 210 or usage statistics associated with the application 210. This information can be provided to the application management system 100 to facilitate making recommendations to the user 205 or to other users who own the same type of device as the user computing device 105. In one embodiment, the application distribution service 150 can add a multi-player module to a single-player game application to allow multiple users of the same game application to play against or with each other.

In another example, the application distribution service 150 can insert a parental control module into the application in order to control access to or available content items on the application 210. In one embodiment, the parental control module includes an access control interface that is configured to be provided to the user 205 when the application starts or when a particular function of the application is selected (e.g. "start game," "load game" or "purchase content"). The access control interface can require that a password, pattern-based input, or other access key be provided before unlocking access to the application or function. For example, if a child attempts to purchase content items from an electronic catalog, the parental control module can present the access control interface and require a correct input before allowing the purchase to proceed.

In one example, code modules can be inserted to take advantage of device-specific hardware features, such as Global Positioning System (GPS) access, 3D acceleration or accelerometer access. As applications can run on different device types (e.g., smart phone or tablet) that do not support the same hardware features, some developers may forego implementing code for taking advantage of particular device-specific features. The developers may believe that implementing such features for all device types would be too complicated or no particular device type has a large enough user base to make the development of the feature worthwhile. In such situations, the application management system 100 may insert code modules for adding support for device-specific hardware features.

As discussed above, one type of module that can be added is a DRM module 240. In one embodiment, if the DRM module determines that the application 210 has been modified without authorization and/or if the DRM module determines that an unauthorized user (or device) is accessing the application 210, the DRM module can present the user with a message and/or cause the application 210 to cease executing. More generally, the DRM module can determine whether the execution of the application 210 is limited in scope, such as to a certain subset of features offered by the application (e.g. free features vs. premium features). If the execution is limited in scope, the DRM module can limit or alter execution of the application 210 to that scope, such as to a shareware portion of the application 210 instead of a full premium version of the application, for example. The DRM module can alter or otherwise modify execution of the application 210 to limit the execution to authorized features (such as shareware or unregistered features). The DRM module can also output a message for presentation to a user that reminds the user to register the application 210, denies the user access to the application 210, or the like. In some embodiments, some or all of the functionality of the DRM module 240 is provided in coordination with the application management system 100. For example, the DRM module 240 may be in communication with and coordinate with the entitlement module 250 of the purchasing service 145.

In one embodiment, process 300 can be performed by application submission module 225 in response to the developer 207 providing the application 210 to the application submission module 225 for transmission to the application management system 100.

In one embodiment, process 300 can be performed in response to the developer 207 activating a feature or plugin associated with the IDE 215. In one embodiment, the IDE 215 can create a copy of the source code associated with the application 210 and can combine the copy of the source code with the purchasing module 235. In one embodiment, the IDE 215 can compile the combination of the source code and the purchasing module 235. In one embodiment, the IDE 215 or the application submission module 144 can provide the compiled combination to the application management system 100. In one embodiment, the IDE 215 or the application submission module 144 can sign the application 210 or the compiled combination of the application 210 and the purchasing module 235 with a developer certificate associated with the developer 207.

In some alternative implementations, the developer system 107 submits source code of the application to the application management system 100 instead of the compiled application. The application management system 100 can then combine the purchasing module 235 with the source code and compile the purchasing module 235 and source code to create the application 210.

Moreover, although the process 300 has been described with respect to the application management system 100 repackaging the application with the purchasing module 235, the purchasing module 235 can be added to the application in other ways. For instance, the application management system 100 can provide the purchasing module 235 to the developer system 107. The developer system 140 can then combine the purchasing module 235 with the application to create an in-app purchasing enabled application.

In some embodiments, a server computing system that has components including a CPU, I/O components, storage, and memory may be used to execute the application management system 100 or specific components of the application management system 100. The executable code modules of the application management system 100 can be stored in the memory of the server and/or on other types of non-transitory computer-readable storage media. In some embodiments, the application management system 100 may be configured differently than described above.

V. Further System Details

As will be apparent, many variations and implementations of the application management system 100 are possible. For example, referring to FIG. 1, the one or more servers 120 can include web servers, application servers, database servers, combinations of the same, or the like. In some embodiments, the network 110 is a publicly accessible network of linked networks, possibly operated by various distinct parties, such as the Internet. In other embodiments, the network 110 may be a private network, such as, for example, a corporate or university network that is wholly or partially inaccessible to non-privileged users. In still other embodiments, the network 110 may include one or more private networks with access to and/or from the Internet.

In some embodiments, the purchasing service 145 monitors content item purchases, transfers of content items, usage of content licenses, prices paid, frequency of purchases, other purchase data or the like, in accordance with the customers' privacy rights. In some embodiments, such data may be anonymized in order to protect customers' privacy. The purchasing service 145 may data mine the collected data to generate one or more reports, identify trends in purchases, determine popular items, determine user preferences, generate recommendations for other products, identify cross-marketing opportunities, identify cross-selling or related products, determine pricing information (e.g., market price, price ranges for content items or types of content items, demand at particular price points, etc.), of content items based on resale prices of the content items or perform other analysis on the data.

The purchasing service 145 can report information and statistics to end users, developers, or personnel (e.g., administrators) of the application management system 100. For example, the purchasing service 145 may track content submission histories, content sales, versioning data for submitted content, purchase data, or the like. In some such embodiments, the purchasing service 145 may provide interactive feedback to the user including, for example, current status of a purchase, time till completion of a download, etc. In some embodiments, the purchasing service 145 can generate a report detailing or summarizing the purchase data and communicate the report to users via electronic mail or provide access to the report, usage statistics, or interactive feedback via Web services.

In some embodiments, the purchasing service 145 can verify entitlements for content items. The purchasing service 145 may communicate with a DRM module incorporated into an application and verify that particular content items are authorized for use on that application. Such functionality can be advantageous in allowing content items to be shared across copies of applications. For example, a user can download previously purchased content items to another copy of an application on a different user computing device 105 and a DRM module on that second application copy can validate that the user has already purchased the content items.

In one embodiment, the purchasing service 145 utilizes security tokens (or other authentication data) for securing or validating access to applications and/or content items. The security tokens can be used to control usage of the content items or manage transfers of the content items. For example, the security tokens can include computing device identifiers or other parameters that uniquely identify user computing devices 105. The security token can be associated with a particular content item. The security token can be created to include a checksum of the content item and information relating to the user who purchases the content item. For example, the security token can include a user identifier and a device identifier, to name a couple. Some events, such as transfer of the content item to another user computing device 105 can cause the purchasing service 145 to update the security token. Likewise, the security token can also be used to control usage or manage transfers of applications.

The security token may also include parameters specifying the situations in which the content item associated with the token may be used. In some embodiments, the security token includes a time limit specifying how long the security token is valid; in such embodiments, the purchasing service 145 authenticates the token only if the time limit has not passed or if a timestamp of the security token is within the time limit or within a threshold time range (e.g., within 30 minutes of purchase, 1 hour, 1 day, etc). For example, during authentication, the purchasing service 145 may decrypt the token and check its time limit or other value. If the time limit is past, the application management system 100 may determine if a new security token should be issued (e.g., if the user purchases a new subscription) or if access to the content item should be blocked. In some embodiments, the security token is a one-time use token, and the purchasing service 145 authenticates the token only if the token has not already been used.

In creating the checksum for the security token, digital certificate(s) associated with the application developers and/or the application management system 100 can be included with or applied to the checksum. Further, in creating a security token, a certificate can be used to sign the security token; this provides a level of assurance that the security token has not been modified by an entity other than the entity that created the security token. Generally, a digital certificate identifies a user or an organization and provides a level of assurance that the user or the organization is who he/she/it claims to be. This level of assurance is associated with the trust placed in the certificate authority that issues the certificate. The certificate typically includes, among possibly other things, a public key associated with the certificate owner's private key and an issuer that identifies an entity (e.g., the certificate authority) that verified the certificate owner. Non-limiting examples of certificate provider systems or certificate authorities include VeriSign™, GoDaddy™, and Comodo™. Generally, these certificate provider systems are the certificate issuers identified with the digital certificate. The certificate may be stored in the data storage 170 or other system capable of storing certificates.

In response to a user purchasing a digital content item, the application management system 100 can provide the digital content item along with the security token to the associated application operating on the user computing device 105. The DRM module on the associated application can use the security token to determine whether to provide access to the content item on the user computing device 105. In the event of a loss of entitlement to the content item or after determining that access should be revoked, the purchasing service 145 can cause the security token to expire in order to prevent further access to the content item or can cause the content item to be disabled or deleted, for example, by communicating with the DRM module and issuing a command to remove the content item.

As mentioned above, the purchasing service 145 can also provide personalization services. Examples of personalization services include recommendation services, personalized search services, and tag-based services. A recommendation service can use any of a variety of algorithms for generating recommendations, including behavior-based algorithms. In some embodiments, such behavior-based algorithms can analyze user behavior to generate item-to-item mappings and can use these mappings to recommend items related to a user's item selection activities. Personalized search services can recommend search queries to users, in some implementations. Tag-based services can provide functionality for users to apply textual tags to items in the catalog to thereby categorize the items. Other personalization services can include list services, where users create lists of items, blogging services, personalized social networking services, and the like.

The application data store 160 can store application data, such as applications and content items associated with respective applications. The application data may include images, binaries, videos, and/or other electronic data, and may be grouped as a content bundle comprising a single content file or stream, a compressed file (e.g., ZIP, RAR, or other compressed file format) or multiple files. Typically, the application data is stored and/or transmitted as electronic files, though the application data may also be transmitted as one or more data streams. The application data store 160 may also store content metadata describing the content data. In some embodiments, the content metadata comprises content file titles, descriptions, key words, content price, versioning information and/or the like. The content metadata may be provided by the catalog service 140 on its catalog and associated with respective content data.

In some embodiments, the application management system 100 maintains accounts for its users in the data store for user data 170. The application management system may maintain different types of accounts for different types of users (e.g., developers and customers) or the accounts may be the same type. In one embodiment, the account of a developer can include information about the developer's applications and content items, such as the price of the content, description of the content, current version of the content or other account information. This data can be updated based at least partly on content submissions sent by the developer. For example, if a developer wants to publish a new version a content item, the developer can register the new content item. The application management system can then update the information associated with that content item. Customer accounts may include information about content purchases, credit card or payment information, account balance, shipping options, address, user computing device information (e.g., unique device identifier, device model, device specifications, operation system, IP address, port address, network address), or the like.

The services provided by the application management system 100 can be accessed by applications, for example, by applications having inserted code modules for providing additional functionality. The application management system 100 can be implemented with one or more physical servers or computing machines, such as several computing machines interconnected via a network. Thus, each of the components depicted in the application management system 100 can include hardware and/or software for performing various features. In one embodiment, the application management system 100 includes or provides a web site or collection of web sites. Like the application management system 100, developer systems 107 can be implemented in hardware and can include any type of computing device. The developer systems 107 can, but need not be, operated by entities who are different from one another and who are different from an operator of the application management system 100.

The processing of the various components of the application management system 100 can be distributed across multiple machines, networks, and other computing resources. The various components of the application management system 100 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the application management system 100 may be configured differently than illustrated in FIG. 1. For example, various functionalities provided by the illustrated modules can be combined, rearranged, added, or deleted. In some embodiments, additional or different processors or modules may perform some or all of the functionalities described with reference to the example embodiment illustrated in FIG. 1. Many implementation variations are possible.

Other types of programmatic interactions (additionally or alternatively) between the application management system 100, the user computing devices 105 and developer systems 107 are possible in addition to those described above. For example, a service request can be received directly from a user (e.g., via an interactive console or other GUI provided by the application management system 100) or from an executing program on a user computing device 105. In some embodiments, users may interact with the application management system 100 using other types of interfaces and in other ways. For example, the application management system 100 may provide a web services interface (e.g., a web page or set of web pages) that allows a user to submit a request using a web browser. Other types of interfaces may also be used.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain event, method or process blocks may be omitted in some implementations. The methods and processes described herein are also not limited to any particular sequence, and the events, blocks or states relating thereto can be performed in other sequences that are appropriate. For example, described tasks or events may be performed in an order other than that specifically disclosed, or multiple blocks may be combined in a single block or state. The example blocks, tasks or events may be performed in serial, in parallel, or in some other manner. Blocks, tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A computer-implemented method of processing developer-submitted applications, the process comprising:
   receiving, over a network, in association with an account of an application submitter, a submission by the application submitter of an application, said application lacking functionality for end users to purchase content items for the application, from within the application, from an electronic catalog, wherein a content item for a particular application is a digital resource, usable by the particular application, that expands the content of the particular application;
   modifying the application by adding a purchasing module that provides functionality for a user to purchase content items for the application, from the electronic catalog from within the application, wherein modifying the application comprises decompiling at least a portion of the application to create source code, modifying the source code to add the purchasing module, thereby creating modified source code, and compiling at least some of the modified source code to create a modified application comprising the purchasing module; and
   making the modified application available in the electronic catalog to end users;
   said process performed by a computing system that comprises one or more computing devices.

2. The method of claim 1, the process further comprising combining a digital rights management (DRM) module with the application.

3. The method of claim 2, wherein the DRM module is configured to halt execution of the modified application in response to determining that an unauthorized change to the application has been made.

4. The method of claim 1, the process further comprising combining a parental control module with the application.

5. The method of claim 4, wherein the parental control module is configured to present an access control interface that requests input of an access key.

6. The method of claim 5, wherein the parental control module is configured to prevent purchases on the electronic catalog unless the access key is provided on the access control interface.

7. The method of claim 1, wherein said modifying the application further comprises identifying one or more entry points associated with the application.

8. The method of claim 7, wherein said modifying the application further comprises inserting purchasing code into the application, the purchasing code being configured to execute in connection with execution of the one or more entry points.

9. The method of claim 7, wherein the one or more entry points comprise one or more routines configured to perform one or more of the following functions: launching the application, terminating the application, pausing the application, and resuming the application from a paused state.

10. The method of claim 1, wherein the electronic catalog comprises an application store accessible with a mobile device over a network.

11. The method of claim 1, wherein the content items comprise one or more of a game map, a game item, a character, a user interface theme, music, and a game level.

12. The method of claim 1, further comprising:
providing the modified application to the application submitter;
receiving a signed copy of the modified application from the application submitter, wherein the signed copy is signed with a developer certificate associated with the application submitter; and
verifying that the signed copy of the modified application is signed with a certificate.

13. The method of claim 1, further comprising signing the modified application with an application provider certificate.

14. A system for processing submitted applications, the system comprising:
an application distribution system comprising computer hardware, the application distribution system configured to:
receive, over a network, in association with an account of an application submitter, a submission by the application submitter of an application, said application lacking functionality for at least one of enabling end users to purchase content items for the application, from within the application, from an electronic catalog and controlling access to the electronic catalog from within the application, wherein a content item for a particular application is a digital resource, usable by the particular application, that expands the content of the particular application; and
modify the application by adding at least one of (1) a purchasing module that provides functionality enabling a user to purchase content items for the application from the electronic catalog from within the application and (2) a parental control module enabling the user to control access from within the application to the electronic catalog, wherein modifying the application comprises decompiling at least a portion of the application to create source code, modifying the source code to add at least one of the purchasing module and the parental control module, and compiling at least some of the modified source code to create a modified application.

15. The system of claim 14, wherein the application distribution system is further configured to make the application, as modified to add at least one of the purchasing module and the parental control module, available in the electronic catalog to end users.

16. The system of claim 14, wherein the purchasing module is configured to authenticate content items downloaded to the end user device.

17. The system of claim 14, wherein the purchasing module includes a catalog interface configured to provide access to a listing of content items for the application.

18. The system of claim 17, wherein the purchasing module communicates with a catalog service that provides the listing of content items.

19. The system of claim 14, wherein the purchasing module is configured to communicate with a purchasing service configured to process payments for content items associated with the application.

20. The system of claim 19, wherein the purchasing service is configured to collect and distribute taxes on the purchases.

21. The system of claim 19, wherein the purchasing service is configured to process payments for content items associated with the application.

22. The system of claim 14, wherein the application distribution system is further configured to:
provide the modified application to the application submitter;
receive a signed copy of the modified application from the application submitter, wherein the signed copy is signed with a developer certificate associated with the application submitter; and
verify that the signed copy of the modified application is signed with a certificate.

23. The system of claim 14, wherein the application distribution system is further configured to sign the modified application with an application provider certificate.

24. The method of claim 1, wherein modifying the application is performed automatically by the computer system in response to a developer submission of the application.

25. Non-transitory physical computer storage having stored thereon an executable application generated according to a process that comprises:
receiving, over a network in association with an application submitter account, a submission of an application from an application submitter, said application lacking functionality for accessing additional content items for the application from within the application, using an electronic catalog, wherein a content item for a particular application is a digital resource, usable by the particular application, that expands the content of the particular application; and
modifying the received application by combining the application with a functionality module that provides additional functionality with the application, said functionality module adding functionality for accessing the additional content items for the application from within the application, wherein combining the application with the functionality module comprises decompiling at least some source code of the application, altering source code related to the functionality module, and recompiling at least some source code of the application.

26. The non-transitory physical computer storage of claim 25, the process further comprising making the application, as modified to add the functionality module, available in the electronic catalog to end users.

27. The non-transitory physical computer storage of claim 25, wherein said added functionality for accessing the content items provided by said functionality module comprises controlling unauthorized access to the content items.

28. The non-transitory physical computer storage of claim 25, wherein said added functionality for accessing the content items provided by said functionality module comprises enabling control of access to an electronic catalog listing a plurality of content items for the application.

29. The non-transitory physical computer storage of claim 25, wherein said added functionality for accessing the content items provided by said functionality module comprises enabling purchases of the content items from an electronic catalog.

30. The system of claim 14, wherein the application distribution system is further configured to modify the application automatically by in response to a developer submission of the application.

* * * * *

UNITED STATES PATENT AND TRADEMARK OFFICE
CERTIFICATE OF CORRECTION

PATENT NO.         : 8,527,361 B2                                    Page 1 of 1
APPLICATION NO.    : 13/170074
DATED              : September 3, 2013
INVENTOR(S)        : Paleja et al.

It is certified that error appears in the above-identified patent and that said Letters Patent is hereby corrected as shown below:

On the Title Page (item 54), and in the Specification, Column 1, lines 1-2, in the title of the invention, delete "IN-APPLICATION SHOPPING".

In the Specification

At column 8 at lines 59-60, replace "on Create( ) on Start( ) on Pause( ) on Resume( ) and on Destroy( )" with --onCreate( ), onStart( ), onPause( ), onResume( ) and inDestroy( )--.

Signed and Sealed this
Ninth Day of September, 2014

Michelle K. Lee
*Deputy Director of the United States Patent and Trademark Office*